US012567896B2

(12) United States Patent
  Tsai et al.

(10) Patent No.: US 12,567,896 B2
(45) Date of Patent: Mar. 3, 2026

(54) REPEATER FOR DOWNLINK TRANSMISSION AND UPLINK TRANSMISSION

(71) Applicant: MediaTek Singapore Pte. Ltd., Singapore (SG)

(72) Inventors: Cheng-Rung Tsai, Hsin-Chu (TW); Pei-Kai Liao, Hsin-Chu (TW); Chia-Chun Hsu, Hsin-Chu (TW); Francesc Boixadera-Espax, Cambridge (GB); Per Johan Mikael Johansson, Singapore (SG); Tsang-Wei Yu, Hsin-Chu (TW)

(73) Assignee: MEDIATEK Singapore Pte. Ltd, Singapore (SG)

( * ) Notice: Subject to any disclaimer, the term of this patent is extended or adjusted under 35 U.S.C. 154(b) by 0 days.

(21) Appl. No.: 18/140,515

(22) Filed: Apr. 27, 2023

(65) Prior Publication Data

US 2023/0318695 A1     Oct. 5, 2023

Related U.S. Application Data

(63) Continuation of application No. PCT/CN2021/127913, filed on Nov. 1, 2021.

(60) Provisional application No. 63/107,558, filed on Oct. 30, 2020.

(51) Int. Cl.
  *H04B 7/155*      (2006.01)
  *H04L 5/00*      (2006.01)
  *H04W 24/10*      (2009.01)

(52) U.S. Cl.
  CPC ....... *H04B 7/15528* (2013.01); *H04L 5/0051* (2013.01); *H04W 24/10* (2013.01)

(58) Field of Classification Search
  None
  See application file for complete search history.

(56) References Cited

U.S. PATENT DOCUMENTS

| | | | |
|---|---|---|---|
| 2010/0284446 A1 | 11/2010 | Mu | |
| 2011/0136525 A1 | 6/2011 | Fujii | H04W 84/10 |
| 2017/0208574 A1 | 7/2017 | Ramakrishna | |
| 2020/0280355 A1 | 9/2020 | Abedini | |
| 2020/0322037 A1 | 10/2020 | Abedini | |
| 2020/0344813 A1 | 10/2020 | Li | |

(Continued)

FOREIGN PATENT DOCUMENTS

| | | |
|---|---|---|
| CN | 102265530 A | 11/2011 |
| CN | 104735817 A | 6/2015 |

(Continued)

OTHER PUBLICATIONS

Qualcomm, "NR Repeaters Motivation AI: 9.1.2", 3GPP TSG RAN Meeting #89e, RP-201831, Sep. 14-18, 2020.*

(Continued)

*Primary Examiner* — Walter J Divito
(74) *Attorney, Agent, or Firm* — Helen Mao; Imperium Patent Works

(57) ABSTRACT

Repeater and control method are provided for DL transmission and UL transmission between a BS and a UE. In one novel aspect, the repeater establishes a control link with the BS. Then, the repeater configures an amplify and forward link between the BS and the UE by at least one configuration of the control link.

20 Claims, 6 Drawing Sheets

(56)            References Cited

U.S. PATENT DOCUMENTS

| | | | | |
|---|---|---|---|---|
| 2020/0403689 | A1* | 12/2020 | Rofougaran | ........ H04W 52/245 |
| 2021/0051679 | A1* | 2/2021 | Abedini | ................. H04B 7/088 |
| 2021/0068050 | A1* | 3/2021 | Sampath | ............... H04W 48/10 |

FOREIGN PATENT DOCUMENTS

| | | |
|---|---|---|
| CN | 110505636 A | 11/2019 |
| WO | WO2020176321 A1 | 3/2020 |

OTHER PUBLICATIONS

International Search Report and Written Opinion of International Search Authority for PCT/CN2021/127913, dated Jan. 26, 2022 (9 pages).

European Intellectual Property Office Action 21885361.2-1206, dated Sep. 18, 2024.

Qualcomm: "NR Repeaters Motivation AI: 9.1.2".

China Intellectual Property Office Action 202180073607.0 Dated May 28, 2025.

3GPP TSG RAN Meeting #89e RP-201831, sgr_89e, Qualcomm, RP-201831 "NR Repeaters Motivation".

Hina Intellectual Property Office Search Report 202180073607.

China Intellectual Property Office Action 2202180073607.0 Dated Oct. 22, 2025 (No English Translation available).

3 计算机网络基础 / computing network foundation p. 144 (no English translation available).

3GPP TSG RAN Meeting #89e RP-201831, Qualcomm, NR Repeaters Motivation, Sep. 7, 2020 p. 7-9.

* cited by examiner

ESTABLISH A CONTROL LINK WITH A BS — 801

CONFIGURE AN AF LINK BETWEEN THE BS AND A UE BY AT LEAST ONE CONFIGURATION OF THE CONTROL LINK — 802

RECEIVE AT LEAST ONE PHY LAYER TRANSMISSION FROM THE BS VIA THE AF LINK —803A

TRANSMIT THE AT LEAST ONE PHY LAYER TRANSMISSION TO THE UE VIA THE AF LINK ACCORDING TO THE AT LEAST ONE CONFIGURATION —804A

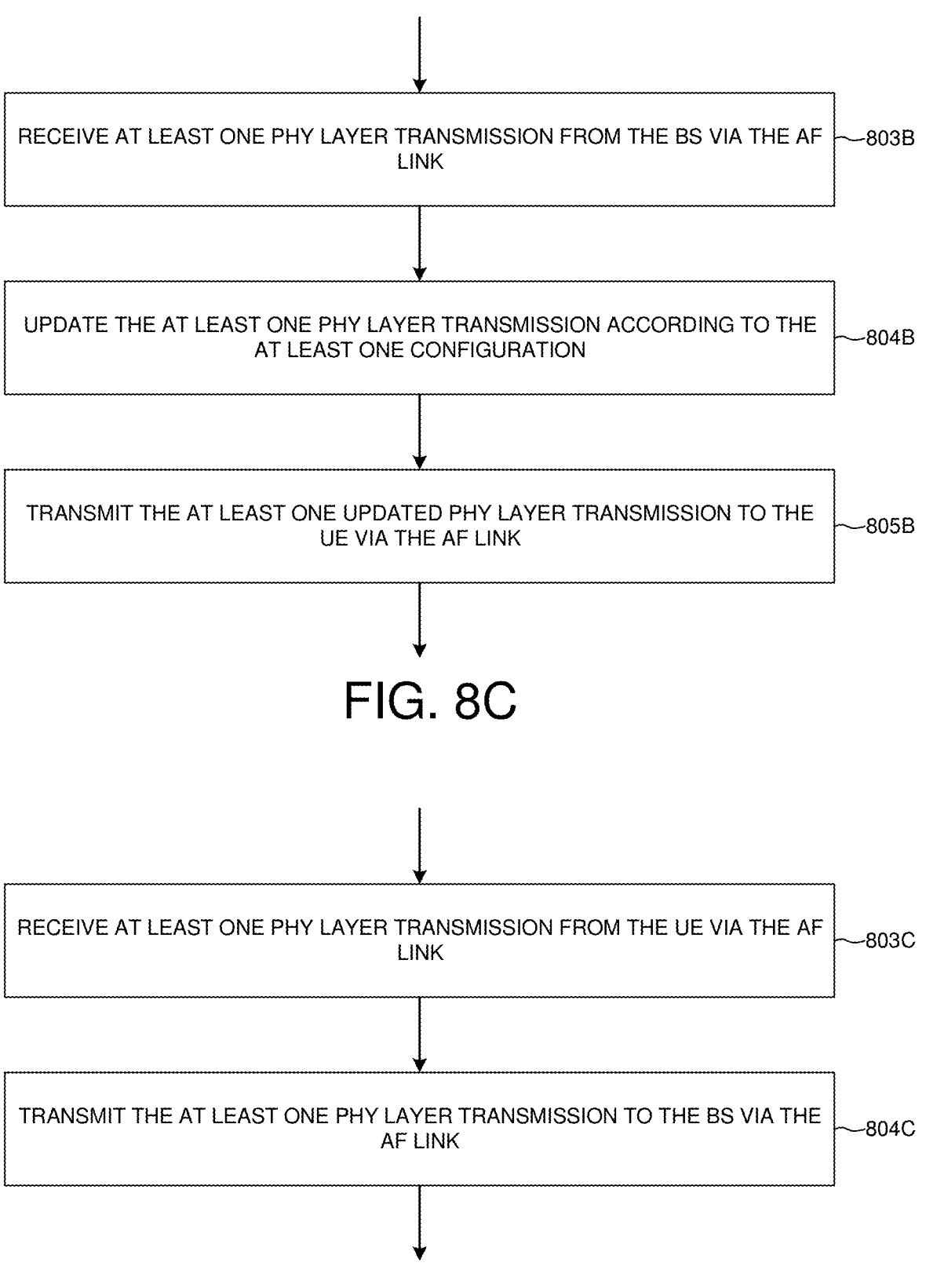

RECEIVE AT LEAST ONE PHY LAYER TRANSMISSION FROM THE BS VIA THE AF LINK ~803B

UPDATE THE AT LEAST ONE PHY LAYER TRANSMISSION ACCORDING TO THE AT LEAST ONE CONFIGURATION ~804B

TRANSMIT THE AT LEAST ONE UPDATED PHY LAYER TRANSMISSION TO THE UE VIA THE AF LINK ~805B

FIG. 8C

RECEIVE AT LEAST ONE PHY LAYER TRANSMISSION FROM THE UE VIA THE AF LINK ~803C

TRANSMIT THE AT LEAST ONE PHY LAYER TRANSMISSION TO THE BS VIA THE AF LINK ~804C

FIG. 8D

REPEATER FOR DOWNLINK TRANSMISSION AND UPLINK TRANSMISSION

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/127913, with an international filing date of Nov. 1, 2021, which in turn claims priority from U.S. Provisional Application No. 63/107,558, entitled "Smart Repeaters," filed on Oct. 30, 2020. This application is a continuation of International Application No. PCT/CN2021/127913, which claims priority from U.S. provisional applications 63/107,558. International Application No. PCT/CN2021/127913 is pending as of the filing date of this application, and the United States is a designated state in International Application No. PCT/CN2021/127913. The disclosure of each of the foregoing documents is incorporated herein by reference.

TECHNICAL FIELD

The disclosed embodiments relate generally to wireless communication, and, more particularly, to repeater for downlink transmission and uplink transmission.

BACKGROUND

In conventional network of 3rd generation partnership project (3GPP) 5G new radio (NR), for enhancing the coverage of NR network communication, additional base station (BS) or integrated access and backhaul (IAB) device can be introduced. However, cost of deploying additional BS and IAB device may be very high. In some situations, a sidelink relay node, which has lower cost of deployment, can be introduced in the NR network for enhancing the coverage of the network communication. Nevertheless, some legacy UEs not supporting sidelink protocol cannot conform with the NR network including the sidelink relay node.

Accordingly, a repeater with compatibility of legacy UE and lower cost of deployment may be introduced in the NR network for enhancing the coverage of the network communication. However, the detail of introducing the repeater in the NR network has not been discussed yet and some issues needs to be solved.

SUMMARY

In one embodiment, a repeater and a control method thereof are provided for downlink (DL) transmission and uplink (UL) transmission between a base station (BS) and a user equipment (UE). In particular, the repeater establishes a control link with the BS. Then, the repeater configures an amplify and forward (AF) link between the BS and the UE by at least one configuration of the control link.

In some cases, the repeater: receives at least one physical (PHY) layer transmission from the BS via the AF link; and transmits the at least one physical layer transmission to the UE via the AF link according to the at least one configuration.

In some cases, the repeater: receives at least one PHY layer transmission from the BS via the AF link; updates the at least one PHY layer transmission according to the at least one configuration; and transmits the at least one updated PHY layer transmission to the UE via the AF link.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 8A to 8D are flow charts of a method of a repeater for DL transmission and UL transmission in accordance with embodiments of the current invention.

DETAILED DESCRIPTION

Reference will now be made in detail to some embodiments of the invention, examples of which are illustrated in the accompanying drawings.

Figure 1:
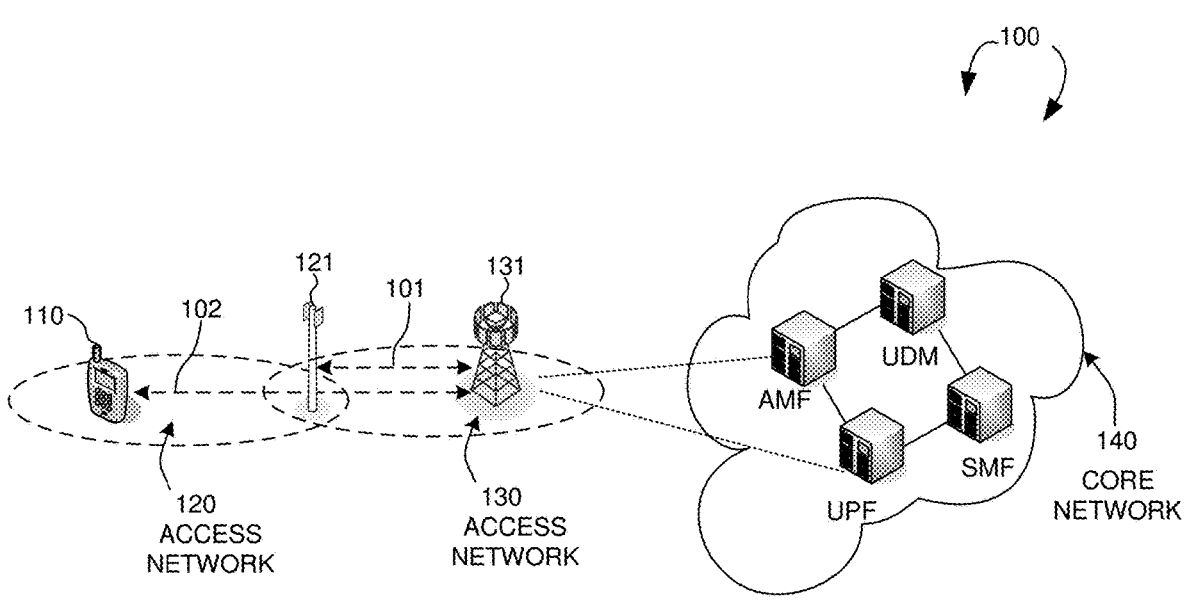
FIG. 1 illustrates an exemplary 5G new radio network supporting repeater for downlink transmission and uplink transmission in accordance with embodiments of the current invention.

FIG. 1 illustrates an exemplary 5G new radio (NR) network 100 supporting repeater for downlink (DL) transmission and uplink (UL) transmission in accordance with aspects of the current invention. The 5G NR network 100 includes a user equipment (UE) 110, a repeater 121, a gNB 131 and a 5G core network 140. Via an amplify-and-forward (AF) function of the repeater 121 operating an access network 120, the UE 110 is communicatively connected to the gNB 131 operating in a licensed band (e.g., 30 GHz-300 GHz for mmWave) of an access network 130 which provides radio access using a Radio Access Technology (RAT) (e.g., the 5G NR technology). The access network 130 is connected to the 5G core network 140 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 131 may provide communication coverage for a geographic coverage area in which communications with the repeater 121. The repeater 121 may provide communication coverage for a geographic coverage area in which communications with the UE 110. A control link 101 shown in the 5G NR network 100 may be established between the repeater 121 and the gNB 131. An AF link 102 shown in the 5G NR network 100 may be established between the UE 110 and the gNB 131 via the repeater 121. The control link 101 may be used for transmitting network parameters associated with the AF link 102 to control the AF link 102. The AF link 102 may include UL transmissions from the UE 110 to the gNB 131 (e.g., on the Physical Uplink Control Channel (PUCCH) or Physical Uplink Shared Channel (PUSCH)) or DL transmissions from the gNB 131 to the UE 110 (e.g., on the Physical Downlink Control Channel (PDCCH) or Physical Downlink Shared Channel (PDSCH)).

It should be noted that, the control link 101 may be utilized for transmitting capability reports of the control link 101 and the AF link 102 to the gNB 131. The capability report of the control link 101 may be related to Layer1/Layer2/Layer3 control information of receiver/transmitter. The capability report of the AF link 102 may be related to DL/UL multi-input multi-output (MIMO), DL/UL carrier aggregation (CA) and maximum DL/UL power gain.

Radio resource control (RRC) configuration for the control link 101 may be related to Layer1/Layer2/Layer3 control information of receiver/transmitter; applied DL/UL power gain for the AF link 102. Measurements to maintain the control link 101 may be related to radio resource measurement (RRM); radio link monitoring (RLM); channel state information (CSI); and sounding reference signal (SRS).

Layer1 control information may include: group common-PDCCH (GC-PDCCH) for slot format indication related to the control link 101 and the AF link 102; DL/UL beam indication related to the control link 101 and the AF link 102; scheduling downlink control information (DCI) for Llayer2/Llayer3 messages related to the control link 101; UL power control command for Layer2/Layer3 messages related to the control link 101; scheduling request (SR) and hybrid automatic repeat request acknowledgement (HARQ-ACK) for Layer2/Layer3 messages related to the control link 101; PDCCH order for timing advance (TA) maintenance for the control link 101; and CSI report and SRS for the control link 101.

Layer2 control information may include: DL/UL beam indication related to the control link 101 and the AF link 102; and random access response (RAR) related to the control link 101. Layer3 control information may include: L3: time-division duplex (TDD) configuration related to the control link 101 and the AF link 102; DL/UL beam configuration related to the control link 101 and the AF link 102; other configurations related to the control link 101.

Figure 2:
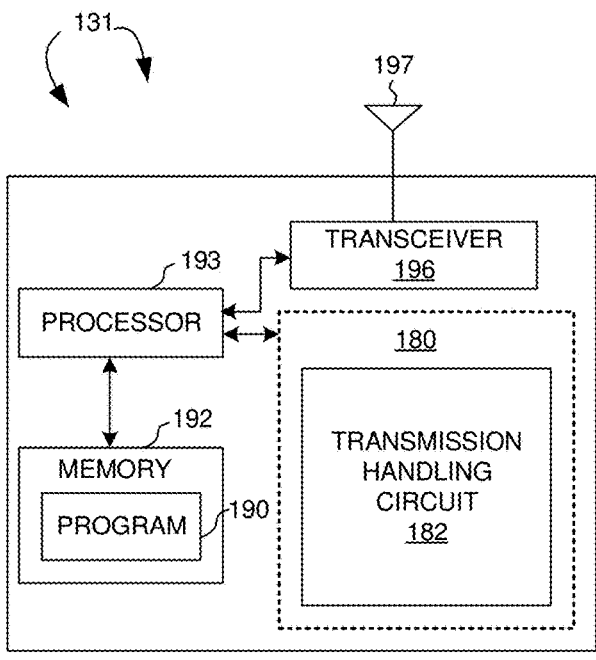
FIG. 2 is a simplified block diagram of the repeater in accordance with embodiments of the current invention.

FIG. 2 is a simplified block diagram of the repeater 121 in accordance with embodiments of the present invention. For the repeater 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the repeater 121. Memory 192 stores program instructions and data 190 to control the operations of the repeater 121.

The repeater 121 includes several functional modules and circuits that can be implemented and configured to perform embodiments of the present invention. In the example of FIG. 2, the repeater 121 includes a set of control functional modules and circuit 180. Transmission handling circuit 182 handles DL/UL transmissions and associated network parameters for the UE 110 and the gNB 131.

Note that the different functional modules and circuits can be implemented and configured by software, firmware, hardware, and any combination thereof. The function modules and circuits, when executed by the processor 193 (e.g., via executing program code 190), allow the repeater 121 to perform embodiments of the present invention.

Figure 3:
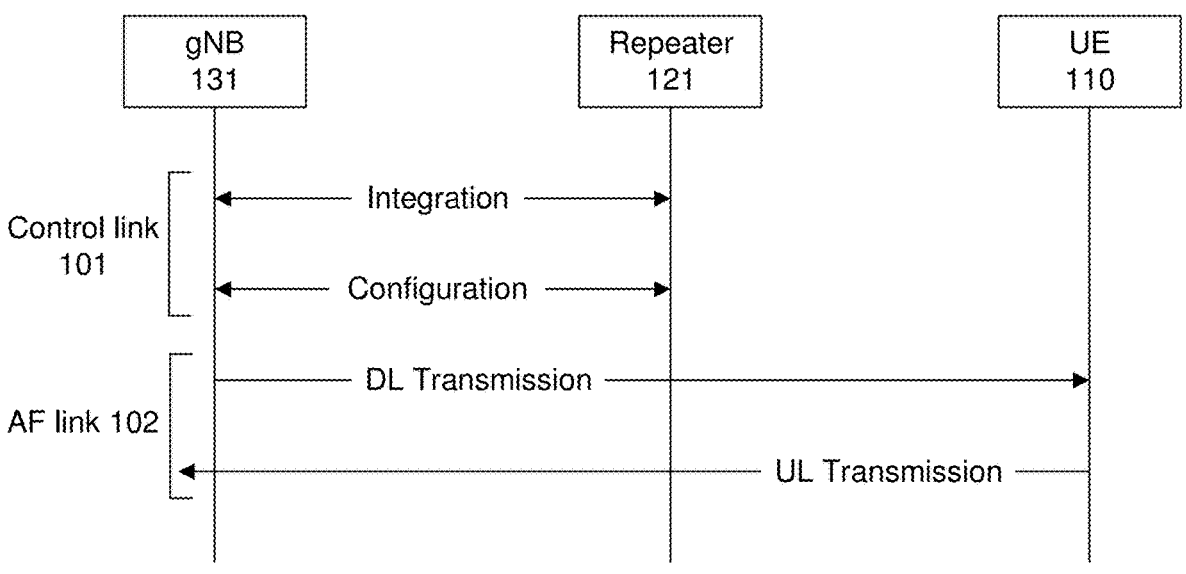
FIG. 3 illustrates one embodiment of network links in accordance with embodiments of the current invention.

FIG. 3 illustrates one embodiment of network links in accordance with one novel aspect. In particular, the control link 101 is established between the repeater 121 and the gNB 131. The control link 101 includes integration transmission and configuration transmission. The AF link 102 is established between the UE 110 and the gNB 131 via the repeater 121. The AF link 102 includes DL transmission from the gNB 131 to the UE 110 and UL transmission from the UE 110 to the gNB 131. The control link 101 may be used for transmitting at least one configuration associated with the AF link 102, and the repeater 121 may configure the AF link 102 by the at least one configuration.

In some embodiments, the at least one configuration indicates the repeater 121 to amplify and forward physical (PHY) layer transmission from the gNB 131 to the UE 110 without regenerating the PHY layer transmission.

In one implementation, the repeater 121 receives at least one PHY layer transmission from the gNB 131 via the AF link 102. The at least one PHY layer transmission may include a PHY layer transmission such as Synchronization Signal and PBCH block (SSB), Random Access Channel (RACH), common PDCCH etc. (i.e., a common PHY layer transmission), and may be associated with a determined beam between the gNB 131 and the repeater 121. Then, the repeater 121 transmits the at least one PHY layer transmission to the UE 110 via the AF link 102 according to the at least one configuration.

Figure 4:
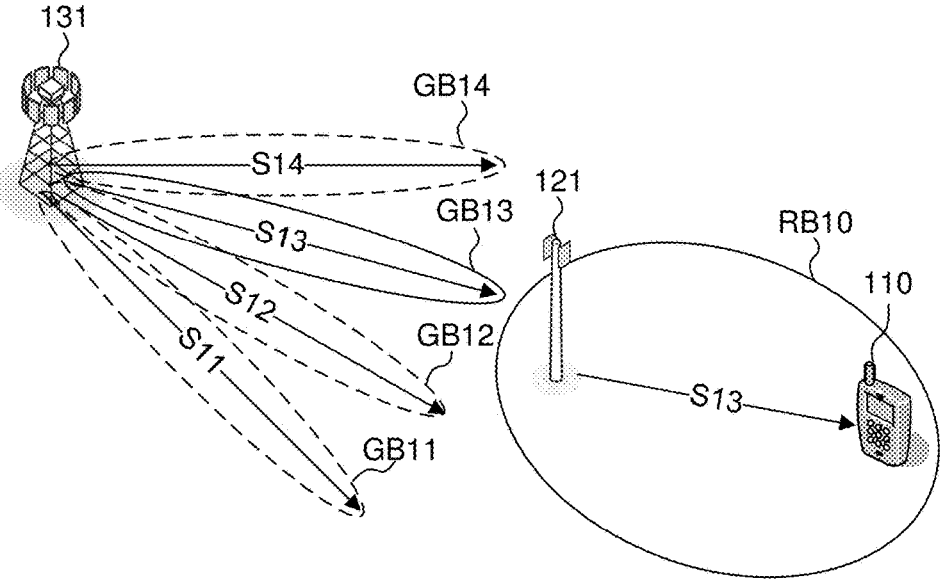
FIG. 4 illustrates one embodiment of beam status associated with the PHY layer transmission including SSB in accordance with embodiments of the current invention.

For example, FIG. 4 illustrates one embodiment of beam status associated with the PHY layer transmission including SSB in accordance with one novel aspect. In this example, the repeater 121 receives four SSB S11 to S14 through corresponding beams GB11 to GB14 from the gNB 131 via the AF link 102. The beam GB13 corresponding to the SSB S13 is determined to be utilized between the gNB 131 and the repeater 121.

Then, without regenerating SSB, the repeater 121 transmits the SSB S13 to the UE 110 through a predetermined direction RB10 according to the at least one configuration via the AF link 102. In this example, the predetermined direction RB10 includes an omni-directional direction, and all UEs (including the UE 110) in the coverage of the repeater 121 see the same strongest SSB, which is SSB S13. It should be noted that, in another example, the predetermined direction may include a beam with fixed direction between the repeater 121 and the UE 110.

In one implementation, the repeater 121 receives a plurality of PHY layer transmissions from the gNB 131 via the AF link 102. The PHY layer transmissions may include a PHY layer transmission such as UE-specific PDCCH, PDSCH, Channel State Information-Reference Signal (CSI-RS) etc. (i.e., a UE-specific PHY layer transmission), and may be associated with a determined beam between the gNB 131 and the repeater 121. Then, the repeater 121 transmits the PHY layer transmissions to the UE 110 via the AF link 102 according to the at least one configuration.

US 12,567,896 B2

5

Figure 5:
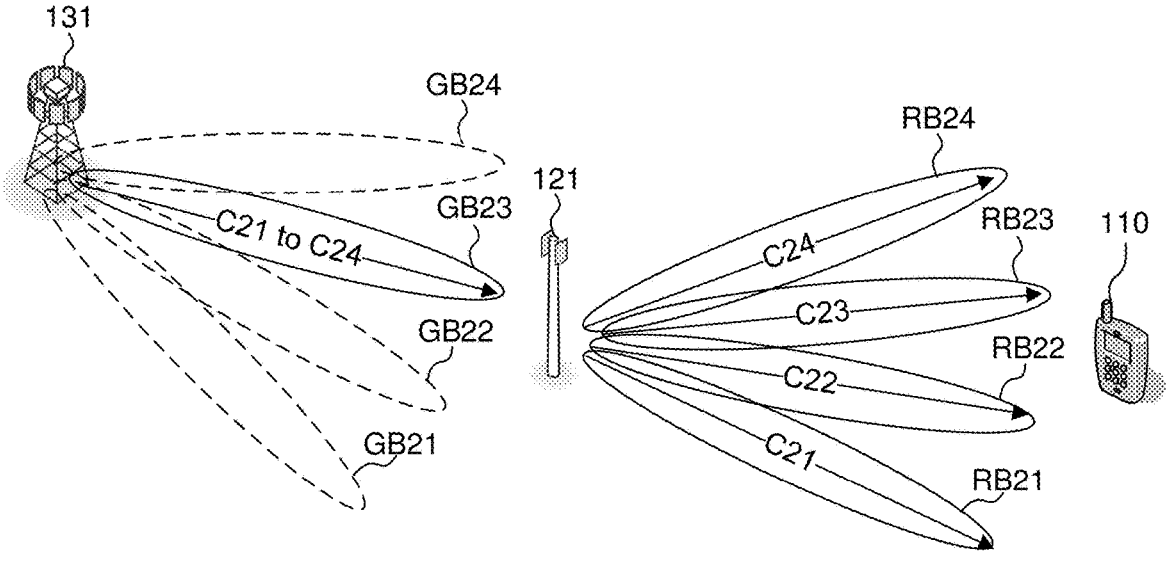
FIG. 5 illustrates one embodiment of beam status associated with the PHY layer transmission including CSI-RS in accordance with embodiments of the current invention.

For example, FIG. 5 illustrates one embodiment of beam status associated with the PHY layer transmissions including CSI-RS in accordance with one novel aspect. In this example, a beam GB23 of beams GB21 to GB24 is determined to be utilized between the gNB 131 and the repeater 121. The UE 110 is configured with repetition=off in network parameter of NZP-CSI-RS-ResourceSet. The repeater 121 receives NZP-CSI-RS-ResourceSet, including CSI-RS C21 to C24, through the determined beam GB23 from the gNB 131. Then, without regenerating CSI-RS, the repeater 121 respectively transmits the CSI-RS C21 to C24 through beams RB21 to RB24 to the UE 110 via the AF link 102.

Further, the repeater 121 may intercept/receive a beam report associated with the beams RB21 to RB24. In one instance, the beam report includes a Reference Signal Receiving Power (RSRP) beam report from the UE 110 to the gNB 131 and is intercepted by the repeater 121. In another instance, the beam report is received from the gNB 131. Then, the repeater 121 determines at least one beam from the beams RB21 to RB24 for transmission between the repeater 121 and the UE 110 according to the beam report.

Figure 6:
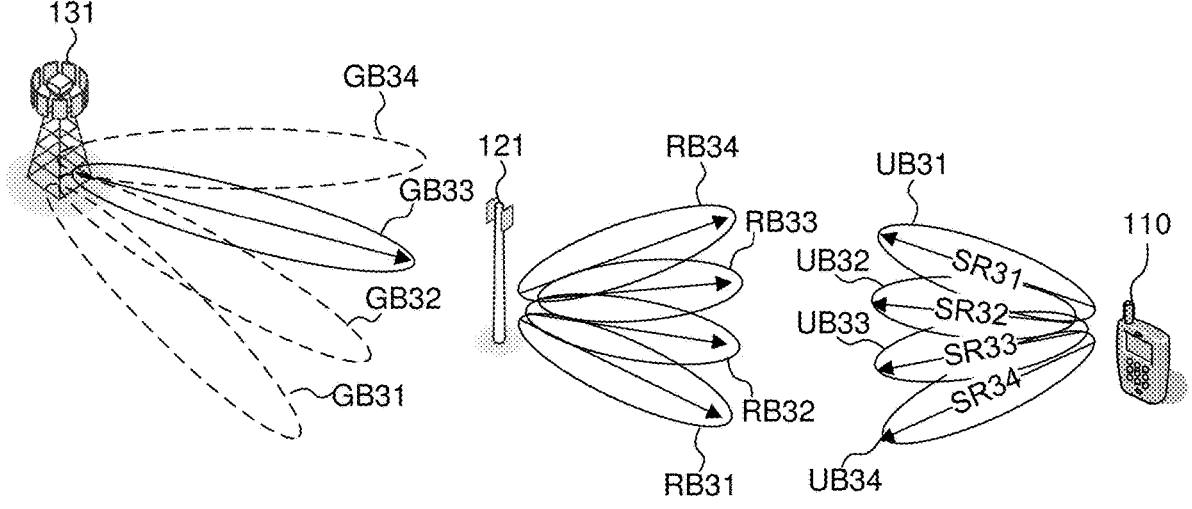
FIG. 6 illustrates one embodiment of beam status associated with the PHY layer transmissions in accordance with embodiments of the current invention.

For another example, FIG. 6 illustrates one embodiment of beam status associated with the PHY layer transmissions in accordance with one novel aspect. In this example, a beam GB33 of beams GB31 to GB34 is determined to be utilized between the gNB 131 and the repeater 121. The UE 110 is configured with usage=beamManagement in network parameter SRS-ResourceSet. The UE 110 transmits SRS-ResourceSet, including SRS resources SR31 to SR34, through beams UB31 to UB34, to gNB 121.

In one instance, in each of beams RB31 to RB34, the repeater 121 receives the SRS resources SR31 to SR34. The repeater 121 determines at least one beam from the beams UB31 to UB34 for the UE 110 to perform transmission according to the SRS resources SR31 to SR34.

In another instance, the repeater 121 receives a beam report associated with the SRS resources SR31 to SR34 from the gNB 131. The repeater 121 determines at least one beam from the beams UB31 to UB34 for the UE 110 to perform transmission according to the beam report.

In some embodiments, the at least one configuration indicates the repeater 121 to regenerate PHY layer transmission from the gNB 131 to the UE 110, and then amplify and forward the regenerated PHY layer transmission.

In one implementation, the repeater 121 receives at least one PHY layer transmission from the gNB 131 via the AF link 102. The at least one PHY layer transmission may include a PHY layer transmission such as SSB, RACH, common PDCCH etc. (i.e., a common PHY layer transmission), and may be associated with at least one beam between the gNB 131 and the repeater 121. Then, the repeater 121 updates the at least one PHY layer transmission according to the at least one configuration. The repeater 121 transmits the updated at least one PHY layer transmission to the UE 110 via the AF link 102.

Figure 7:
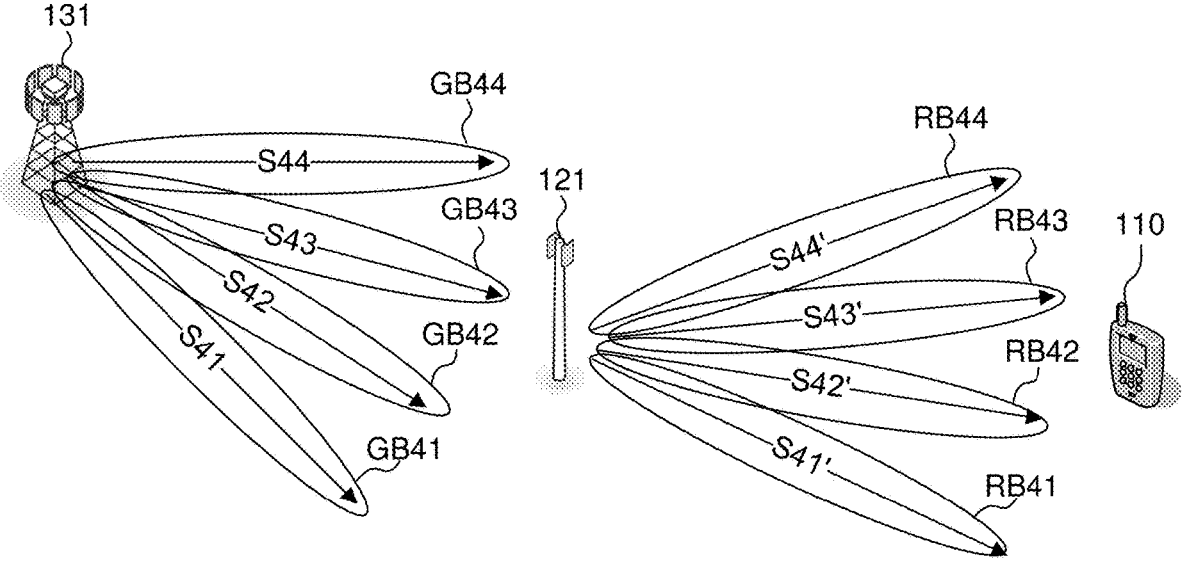
FIG. 7 illustrates one embodiment of beam status associated with the PHY layer transmission including SSB in accordance with embodiments of the current invention.
Figure 8A:
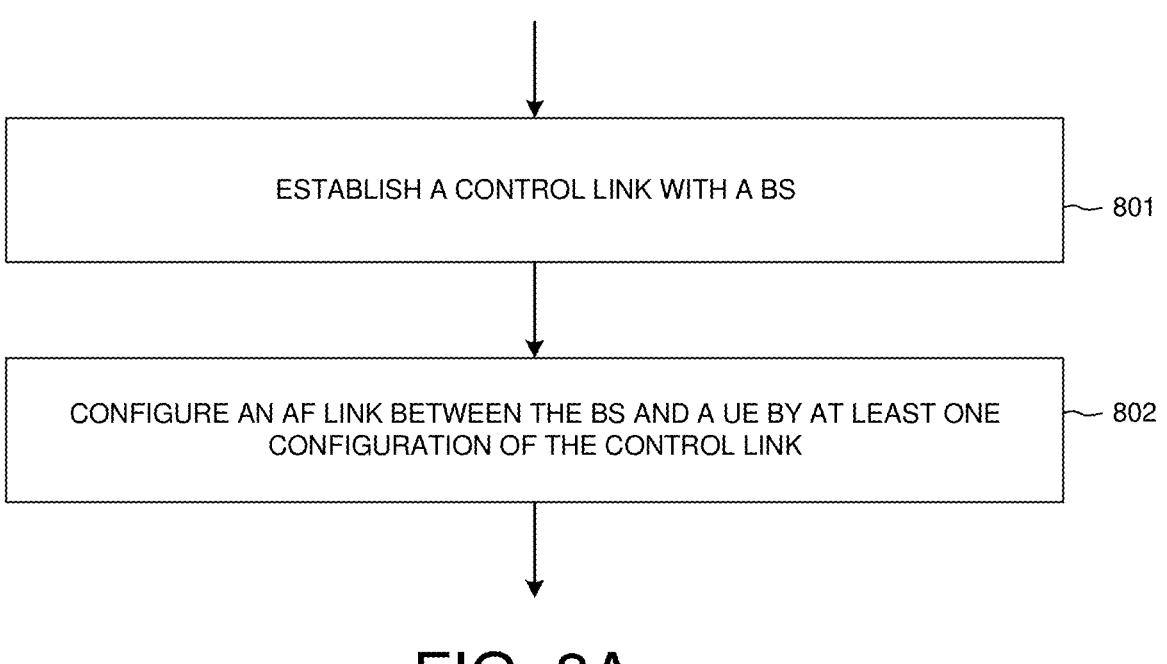
Figure 8B:
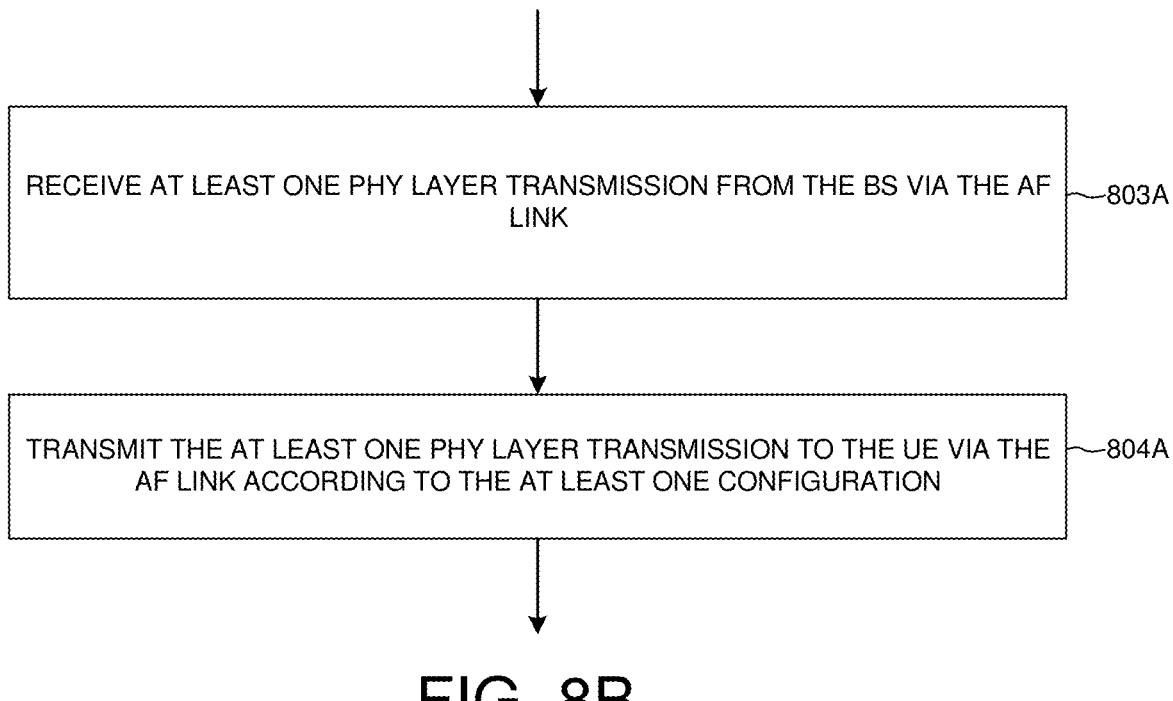

For example, FIG. 7 illustrates one embodiment of beam status associated with the PHY layer transmission including SSB in accordance with one novel aspect. In this example, the repeater 121 receives four SSB S41 to S44 through corresponding beams GB41 to GB44 from the gNB 131 via the AF link 102. Then, the repeater 121 generates four SSB S41' to S44' based on the SSB S41 to S44 according to the at least one configuration. The SSB S41' to S44' are associated with beams RB41 to RB44 between the repeater 121 and the UE 110. The repeater 121 respectively transmits the SSB SR41' to SR44' to the UE 110 through the beams RB41 to RB44 via the AF link 102.

In one implementation, the repeater 121 receives at least one PHY layer transmission from the gNB 131 via the AF link 102. The at least one PHY layer transmission may include a PHY layer transmissions such as UE-specific PDCCH, PDSCH, CSI-RS etc. (i.e., a UE-specific PHY layer transmission), and may be associated with at least one beam between the gNB 131 and the repeater 121. Then, the repeater 121 updates the at least one PHY layer transmission according to the at least one configuration. The repeater 121 transmits the updated at least one PHY layer transmission to the UE 110 via the AF link 102.

For example, the repeater 121 receives a plurality of first PHY layer transmissions from the gNB 131 via the AF link 102. The first PHY layer transmissions include UE-specific PDCCH, PDSCH, CSI-RS etc. (i.e., a UE-specific PHY layer transmission), and are associated with a first beam between the gNB 131 and the repeater 121. Then, the repeater 121 generates a plurality of second PHY layer transmissions based on the first PHY layer transmissions according to the at least one configuration. The second PHY layer transmissions are associated with a plurality of second beams between the repeater 121 and the UE 110. The repeater 121 respectively transmits the second PHY layer transmissions to the UE 110 through the second beams via the AF link 102.

In some embodiments, the repeater above may receive issue command (e.g., downlink control information, DCI) in advance so that the repeater may be ready for the configurations of blocks associated with the AF link. For example, the repeater can be ready for switching to a beam at correct timing for UE specifically transmitted signals and channels.

FIGS. 8A to 8D are flow charts of a method of a repeater for DL transmission and UL transmission in accordance with one novel aspect. In step 801, a repeater establishes a control link with a BS. In step 802, the repeater configures an AF link between the BS and a UE by at least one configuration of the control link.

In some implementations, after step 802, in step 803A, the repeater receives at least one PHY layer transmission from the BS via the AF link. In this case, the at least one configuration indicates the repeater to amplify and forward the at least one PHY layer transmission from the BS to the UE without regenerating the PHY layer transmission. In step 804A, the repeater transmits the at least one PHY layer transmission to the UE via the AF link according to the at least one configuration.

In one example of steps 803A and 804A, the at least one PHY layer transmission includes a PHY layer transmission (e.g., a common PHY layer transmission such as SSB, RACH, common PDCCH) associated with one or more beams between the BS and the repeater. The repeater receives the PHY layer transmission through the one or more beams from the BS via the AF link. The repeater transmits the PHY layer transmission to the UE through a predetermined direction according to the at least one configuration via the AF link.

In another example of steps 803A and 804A, the at least one PHY layer transmission includes a plurality PHY layer transmissions (e.g., a UE-specific PHY layer transmission such as UE-specific PDCCH, PDSCH, CSI-RS) associated with one or more first beams between the BS and the repeater. The repeater receives the plurality of PHY layer transmissions through the one or more beams from the BS via the AF link. The repeater transmits the plurality of PHY layer transmissions to the UE through one or more second beams between the repeater and the UE via the AF link according to the at least one configuration.

In one case, the repeater receives a beam report associated with the one or more second beams between the repeater and the UE. The beam report includes an RSRP beam report intercepted by the repeater from the UE to the BS, or the beam report is received from the BS. Then, the repeater determines at least one beam from the one or more second beams for transmission between the repeater and the UE according to the beam report.

In another case, the UE is configured with an SRS set, which includes a plurality of SRS resources associated with one or more third beams between the UE and the repeater, by the BS. The repeater receives the SRS resources from the UE through each of the one or more second beams between the repeater and the UE, or receives a beam report associated with the SRS resources from the BS. Then, the repeater determines at least one beam from the one or more third beams for the UE to perform transmission according to the SRS resources or according to the beam report.

In some implementations, after step 802, in step 803B, the repeater receives at least one PHY layer transmission from the BS via the AF link. In this case, the at least one configuration indicates the repeater to updates the at least one PHY layer transmission. In step 804B, the repeater updates the at least one PHY layer transmission according to the at least one configuration. In step 805B, the repeater transmits the at least one updated PHY layer transmission to the UE via the AF link.

In one example of steps 803B to 805B, the at least one PHY layer transmission includes a plurality of first PHY layer transmissions (e.g., a common PHY layer transmission such as SSB, RACH, common PDCCH) associated with one or more first beams between the BS and the repeater. The repeater receives the first PHY layer transmissions through the one or more first beams from the BS via the AF link. The repeater updates the at least one PHY layer transmission by generating a plurality of second PHY layer transmissions based on the first PHY layer transmissions according to the at least one configuration. The plurality of second PHY layer transmissions is associated with one or more second beams between the repeater and the UE. Then, the repeater transmits the second PHY layer transmissions to the UE through the one or more second beams via the AF link.

In another example of steps 803B to 805B, the at least one PHY layer transmission includes a plurality of first PHY layer transmissions (e.g., a UE-specific PHY layer transmission such as UE-specific PDCCH, PDSCH, CSI-RS) associated with one or more first beams between the BS and the repeater. The repeater receives the first PHY layer transmissions through the one or more first beams from the BS via the AF link. The repeater updates the at least one PHY layer transmission by generating a plurality of second PHY layer transmissions based on the first PHY layer transmissions according to the at least one configuration. The plurality of second PHY layer transmissions is associated with one or more second beams between the repeater and the UE. Then, the repeater transmits the second PHY layer transmissions to the UE through the one or more second beams via the AF link.

In some implementations, after step 802, in step 803C, the repeater receives at least one PHY layer transmission from the UE via the AF link. In step 804C, the repeater transmits the at least one PHY layer transmission to the BS via the AF link according to the at least one configuration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
establishing, by a repeater, a control link with a base station (BS);
configuring, by the repeater, an amplify and forward (AF) link between the BS and a user equipment (UE) by at least one configuration of the control link, wherein the control link provides one or more configuration for the AF link, comprising: group common-PDCCH (GC-PDCCH) for slot format, DL/UL beam indication related to the AF link, scheduling DCI for Layer2/Layer3 messages, UL power control command for Layer2/Layer3 messages, scheduling request (SR) and hybrid automatic repeat request acknowledgement (HARQ-ACK) for Layer2/Layer3 messages, PDCCH order for timing advance (TA) maintenance, and DL/UL beam configuration;
receiving, by the repeater, at least one physical layer transmission from the BS via the AF link; and
transmitting, by the repeater, the at least one physical layer transmission to the UE via the AF link according to the at least one configuration.

2. The method of claim 1, wherein the step of transmitting the at least one physical layer transmission to the UE via the AF link according to the at least one configuration further comprises:
transmitting, by the repeater, the at least one physical layer transmission to the UE through a predetermined direction.

3. The method of claim 1, wherein the step of transmitting the at least one physical layer transmission to the UE via the AF link according to the at least one configuration further comprises:
transmitting, by the repeater, the at least one physical layer transmission to the UE through one or more beams between the repeater and the UE via the AF link according to the at least one configuration.

4. The method of claim 3, further comprising:
receiving, by the repeater, a beam report associated with the one or more beams between the repeater and the UE, wherein the beam report includes a Reference Signal Receiving Power (RSRP) beam report intercepted by the repeater from the UE to the BS, or is received from the BS; and
determining, by the repeater, at least one beam from the one or more beams for transmission between the repeater and the UE according to the beam report.

5. The method of claim 3, wherein the UE is configured with a Sounding Reference Signal (SRS) set, which includes a plurality of SRS resources, and the method further comprises:
receiving, by the repeater, the SRS resources from the UE through the one or more beams, or a beam report associated with the SRS resources from the BS; and
determining, by the repeater, at least one beam from the one or more beams to perform transmission according to the SRS resources or according to the beam report.

6. The method of claim 3, wherein the at least one physical transmission includes a UE-specific Physical Downlink Control Channel (PDCCH), a Physical Downlink Share Channel (PDSCH) or Channel State Information-Reference Signal (CSI-RS).

7. The method of claim 1, wherein the at least one physical layer transmission includes a Synchronization Signal and PBCH block (SSB), a Random Access Channel (RACH) or a common Physical Downlink Control Channel (PDCCH).

8. The method of claim 1, further comprising:
updating, by the repeater, the at least one physical layer transmission according to the at least one configuration.

9. The method of claim 8, wherein the at least one physical layer transmission includes a plurality of first physical layer transmissions associated with one or more first beams between the BS and the repeater, and the step of updating the at least one physical layer transmission according to the at least one configuration further comprises:
generating, by the repeater, a plurality of second physical layer transmissions based on the first physical layer transmissions according to the at least one configuration, wherein the plurality of second physical layer transmissions is associated with a plurality of second beams between the repeater and the UE;
wherein the step of transmitting the at least one updated physical layer transmission to the UE further comprises:
transmitting, by the repeater, the second physical layer transmissions to the UE through the second beams via the AF link.

10. The method of claim 1, further comprising:
receiving, by the repeater, at least one physical layer transmission from the UE via the AF link according to the at least one configuration; and
transmitting, by the repeater, the at least one physical layer transmission to the BS via the AF link.

11. A repeater, comprising:
a transceiver; and
a transmission handling circuit that:
establishes a control link with a base station (BS) via the transceiver;
configures an amplify and forward (AF) link between the BS and a user equipment (UE) by at least one configuration of the control link, wherein the control link provides one or more configuration for the AF link, comprising: group common-PDCCH (GC-PDCCH) for slot format, DL/UL beam indication related to the AF link, scheduling DCI for Layer2/Layer3 messages, UL power control command for Layer2/Layer3 messages, scheduling request (SR), hybrid automatic repeat request acknowledgement (HARQ-ACK) for Layer2/Layer3 messages, PDCCH order for timing advance (TA) maintenance, and DL/UL beam configuration; and wherein the transceiver:
receives at least one physical layer transmission from the BS via the AF link; and
transmits the at least one physical layer transmission to the UE via the AF link according to the at least one configuration.

12. The repeater of claim 11, wherein the transceiver further:
transmits the at least one physical layer transmission to the UE through a predetermined direction.

13. The repeater of claim 11, wherein the transceiver further:

transmits the at least one physical layer transmission to the UE through one or more beams between the repeater and the UE via the AF link according to the at least one configuration.

14. The repeater of claim 13, wherein the transceiver further:
receives a beam report associated with one or more beams between the repeater and the UE, wherein the beam report includes a Reference Signal Receiving Power (RSRP) beam report intercepted by the repeater from the UE to the BS, or is received from the BS;
wherein the transmission handling circuit further:
determines at least one beam from the one or more beams for transmission between the repeater and the UE according to the beam report.

15. The repeater of claim 13, wherein the UE is configured with a Sounding Reference Signal (SRS) set, which includes a plurality of SRS resources, and the transceiver further:
receives the SRS resources from the UE through the one or more beams, or a beam report associated with the SRS resources from the BS;
wherein the transmission handling circuit further:
determines at least one beam from the one or more beams to perform transmission according to the SRS resources or according to the beam report.

16. The repeater of claim 13, wherein the at least one physical transmission includes a UE-specific Physical Downlink Control Channel (PDCCH), a Physical Downlink Share Channel (PDSCH) or Channel State Information-Reference Signal (CSI-RS).

17. The repeater of claim 11, wherein the at least one physical layer transmission includes a Synchronization Signal and PBCH block (SSB), a Random Access Channel (RACH) or a common Physical Downlink Control Channel (PDCCH).

18. The repeater of claim 11, wherein the transmission handling circuit further:
updates the at least one physical layer transmission according to the at least one configuration.

19. The repeater of claim 18, wherein the at least one physical layer transmission includes a plurality of first physical layer transmissions associated with one or more first beams between the BS and the repeater, and the transmission handling circuit further:
generates a plurality of second physical layer transmissions based on the first physical layer transmissions according to the at least one configuration, wherein the plurality of second physical layer transmissions is associated with a plurality of second beams between the repeater and the UE;
wherein the transceiver further:
transmits the second physical layer transmissions to the UE through the second beams via the AF link.

20. The repeater of claim 11, wherein the transceiver further:
receives at least one physical layer transmission from the UE via the AF link; and
transmits the at least one physical layer transmission to the BS via the AF link according to the at least one configuration.

* * * * *